United States Patent
Sen et al.

(10) Patent No.: US 11,802,984 B2
(45) Date of Patent: Oct. 31, 2023

(54) METHOD FOR IDENTIFYING SUBSURFACE FEATURES

(71) Applicant: SHELL OIL COMPANY, Houston, TX (US)

(72) Inventors: Satyakee Sen, Houston, TX (US); Russell David Potter, Houston, TX (US); Donald Paul Griffith, Houston, TX (US); Sam Ahmad Zamanian, Houston, TX (US); Sergey Frolov, Houston, TX (US)

(73) Assignee: SHELL USA, INC., Houston, TX (US)

( * ) Notice: Subject to any disclaimer, the term of this patent is extended or adjusted under 35 U.S.C. 154(b) by 196 days.

(21) Appl. No.: 17/510,526

(22) Filed: Oct. 26, 2021

(65) Prior Publication Data

US 2022/0128724 A1  Apr. 28, 2022

Related U.S. Application Data

(60) Provisional application No. 63/106,130, filed on Oct. 27, 2020.

(51) Int. Cl.
   *G01V 1/30* (2006.01)
   *G06N 3/084* (2023.01)
   (Continued)

(52) U.S. Cl.
   CPC ............ *G01V 1/30* (2013.01); *G06F 18/2155* (2023.01); *G06N 3/08* (2013.01); *G06N 3/084* (2013.01);
   (Continued)

(58) Field of Classification Search
   CPC .............. G01V 1/30; G01V 2210/6161; G06F 18/2155; G06N 3/084
   See application file for complete search history.

(56) References Cited

U.S. PATENT DOCUMENTS

| | | | |
|---|---|---|---|
| 2019/0064378 A1* | 2/2019 | Liu | ........................ G01V 1/302 |
| 2019/0162868 A1 | 5/2019 | Salman et al. | |

(Continued)

OTHER PUBLICATIONS

Furlanello et al., "Born-Again Neural Networks" arXiv:1805.04770, vol. 2 ; Jun. 29, 2018, 10 pages.

(Continued)

*Primary Examiner* — John C Kuan
(74) *Attorney, Agent, or Firm* — SHELL USA, INC.

(57) ABSTRACT

A method for improving a backpropagation-enabled process for identifying subsurface features from seismic data involves a model that has been trained with an initial set of training data. A target data set is used to compute a set of initial inferences on the target data set that are combined with the initial training data to define updated training data. The model is trained with the updated training data. Updated inferences on the target data set are then computed. A set of further-updated training data is defined by combining at least a portion of the initial set of training data and at least a portion of the target data and associated updated inferences. The set of further-updated training data is used to train the model. Further-updated inferences on the target data set are then computed and used to identify the occurrence of a user-selected subsurface feature in the target data set.

9 Claims, 3 Drawing Sheets

(51) Int. Cl.
  *G06F 18/214* (2023.01)
  *G06N 3/08* (2023.01)
  *G06N 20/00* (2019.01)
  G06N 3/0895 (2023.01)
  G06N 3/09 (2023.01)

(52) U.S. Cl.
  CPC ..... *G06N 20/00* (2019.01); *G01V 2210/6161* (2013.01); *G06N 3/0895* (2023.01); *G06N 3/09* (2023.01)

(56) References Cited

U.S. PATENT DOCUMENTS

| | | | |
|---|---|---|---|
| 2020/0183035 | A1 | 6/2020 | Liu et al. |
| 2021/0223422 | A1 | 7/2021 | Griffith et al. |
| 2021/0223423 | A1 | 7/2021 | Griffith et al. |
| 2021/0293983 | A1* | 9/2021 | Wei ................ G06N 5/04 |
| 2022/0122001 | A1* | 4/2022 | Choe ............... G06N 3/084 |
| 2022/0245405 | A1* | 8/2022 | Katoh .............. G06N 20/00 |

OTHER PUBLICATIONS

Sen et al., "SaltNet: A Production-scale Deep Learning Pipeline for Automated Salt Model Building" the Leading Edge Mar. 2020, pp. 195-203.
Taylor et al. "Improved Deep Learning With Generic Data Augmentation" IEEE Symposium—Symposium Series on Computational Intelligence SSCI 2018, pp. 1542-1547.

* cited by examiner though by referring to the following detailed description of
METHOD FOR IDENTIFYING SUBSURFACE FEATURES

FIELD OF THE INVENTION

The present invention relates to backpropagation-enabled processes, and in particular to a method for improving a trained backpropagation-enabled process for identifying subsurface features from seismic data.

BACKGROUND OF THE INVENTION

Subsurface models are used for hydrocarbon exploration or other geotechnical studies. Typically, subsurface models are developed by interpreting seismic and other remote-sensing data, and well logging data. The process for developing subsurface models from such field-acquired data is time- and data-intensive. Backpropagation-enabled processes offer the opportunity to speed up time-intensive interpretation processes. Many investigators are using field-acquired seismic data for training the backpropagation-enabled processes. In such cases, investigators apply labels to identified geologic features as a basis for training the backpropagation-enabled process.

WO2018/026995A1 (Schlumberger '995) relates to a method for "Multi-Scale Deep Network for Fault Detection" by generating patches from a known seismic volume acquired from field data, the known seismic volume having known faults. Labels are assigned to the patches and represent a subset of the training areas in a patch. The patch is a contiguous portion of a section of the known seismic volume and has multiple pixels (e.g., 64×64 pixels). The patch is intersected by a known fault specified by a user. A machine learning model is trained by the label for predicting a result to identify an unknown fault in a target seismic volume.

A disadvantage of using field-acquired data for machine learning is that human error or bias is often introduced into field-acquired seismic data interpretation. For example, a human interpreter may draw a series of straight lines to identify a fault, but the fault does not fall exactly on the straight-line segments. Conventional processes, such as those described above, are then trained on a flawed label. Furthermore, field-acquired data may either be difficult to obtain or cumbersome to manage. Finally, the labeling of field-acquired data is time-consuming.

Griffith et al. (WO2019231572A1 and WO2019231573A1) describe generating synthetic subsurface models using geologically realistic model variations of the outcome of a geologic process, a simulated geological process and/or a noise source simulation. In this way, a backpropagation-enabled process is trained with improved effectiveness and accuracy.

Furlanello et al. ("Born-Again Neural Networks" arXiv: 1805.04770v2; 29 Jun. 2018) describes the transfer of knowledge from one machine learning model (the teacher) to another (the student). In a first step, the teacher model is trained from labels. Then, at each consecutive step, a new identical model is initialized from a different random seed and trained from the supervisions of the earlier generation. At the end of the procedure, additional gains can be achieved with an ensemble of multiple student generations.

Sen et al. ("SaltNet: A production-scale deep learning pipeline for automated salt model building" *The Leading Edge* 195-203; March 2020) relates to an end-to-end semi-supervised deep learning pipeline for fully automated salt interpretation during initial model building iterations. Images are passed to the deep learning pipeline without preprocessing. Semisupervised learning is performed and models are retrained in parallel. Each retrained model is used to make prediction for a target survey. Thresholds are applied on the raw probabilities and a salt mask is passed to the imaging team for the next round of migration.

A disadvantage of conventional techniques is the number of false positives generated by the trained models.

There is a need for a method for improving a backpropagation-enabled process for identifying subsurface features from seismic data to reduce the number of false positives.

SUMMARY OF THE INVENTION

According to one aspect of the present invention, there is provided a method for improving a backpropagation-enabled process for identifying subsurface features from seismic data, the method comprising the steps of: (a) providing a backpropagation-enabled model, the backpropagation-enabled model having been trained with an initial set of training data comprising seismic data and initial labels identifying a subsurface feature in the seismic data; (b) providing a target data set; (c) computing a set of initial inferences on the target data set using the initial backpropagation-enabled model; (d) defining a set of updated training data by combining at least a portion of the initial set of training data and at least a portion of the target data and associated initial inferences; (e) training the backpropagation-enabled model with the set of updated training data; (f) computing updated inferences on the target data set with the backpropagation-enabled model trained in step (e); (g) defining a set of further-updated training data by combining at least a portion of the initial set of training data and at least a portion of the target data and associated updated inferences; (h) training the backpropagation-enabled model with the set of further-updated training data; (i) computing further-updated inferences on the target data set with the trained backpropagation-enabled model trained in step (h); and (j) identifying the occurrence of a user-selected subsurface feature in the target data set from the further-updated inferences.

BRIEF DESCRIPTION OF THE DRAWINGS

The method of the present invention will be better understood by referring to the following detailed description of preferred embodiments and the drawings referenced therein, in which.

DETAILED DESCRIPTION OF THE INVENTION

The present invention provides a method for improving a backpropagation-enabled process for identifying subsurface features from seismic data. The method reduces the occurrence of false positives and/or improves the quality of inferences by enforcing consistency criteria. By training multiple times with initial data and inferences computed by the backpropagation-enabled process, consistency is enforced in accordance with the present invention.

Examples of backpropagation-enabled processes include, without limitation, artificial intelligence, machine learning, and deep learning. It will be understood by those skilled in the art that advances in backpropagation-enabled processes continue rapidly. The method of the present invention is expected to be applicable to those advances even if under a different name. Accordingly, the method of the present invention is applicable to the further advances in backpropagation-enabled process, even if not expressly named herein.

The backpropagation-enabled process may be supervised processes, semi-supervised processes or a combination thereof.

Figure 1:
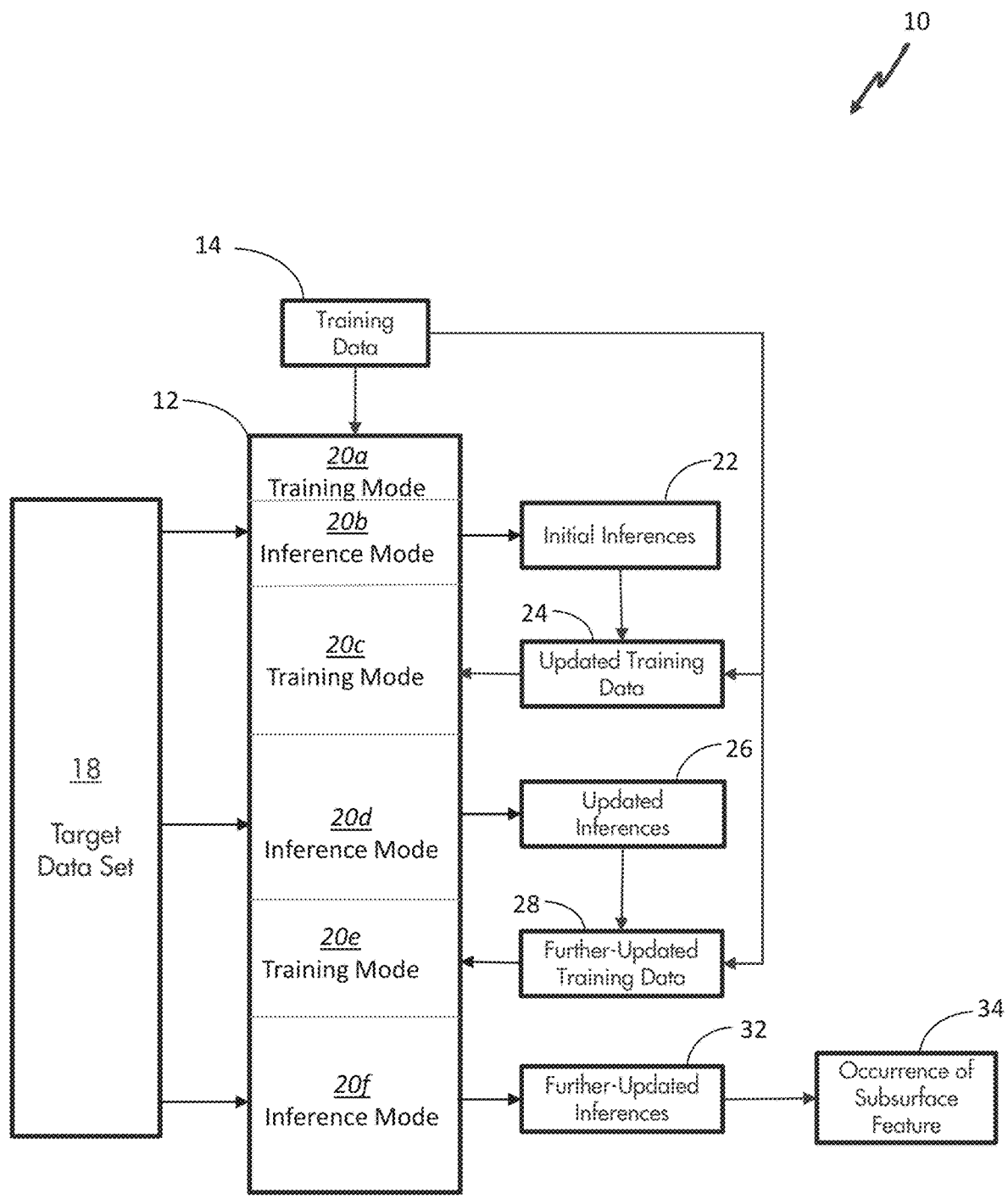
FIG. 1 is a flow diagram illustrating one embodiment of the method of the present invention.

Referring to FIG. 1, the method of the present invention 10 improves a backpropagation-enabled process by providing one or more backpropagation-enabled models 12. For ease of discussion herein, reference to the one or more backpropagation-enabled models 12 will be in singular form. But it will be understood that reference to the backpropagation-enabled model 12 is intended to mean one or more backpropagation-enabled models 12.

The backpropagation-enabled model 12 has been trained, in a training mode 20a, with an initial set of training data 14 comprised of seismic data and initial labels identifying a subsurface feature in the seismic data. The seismic data may be selected from real seismic data, synthetically generated seismic data, augmented seismic data, and combinations thereof. The backpropagation-enabled models 12 may have the same or different architecture.

For real seismic data, the associated labels describing subsurface features in the image are manually generated, while labels for simulated seismic data are automatically generated. The generation of labels, especially manual label generation, is time-intensive and requires expertise and precision to produce an effective set of labels.

By augmented data, we mean field-acquired and/or synthetically generated data that is modified, for example, by conventional DL data-augmentation techniques, as described in Taylor et al. ("Improved deep learning with generic data augmentation" *IEEE Symposium-Symposium Series on Computational Intelligence SSCI* 2018 1542-1547; 2018) which describes conventional augmenting by geometrical transformation (flipping, cropping, scaling and rotating) and photometric transformations (amending color channels to change lighting and color by color uttering and Fancy Principle Component Analysis). Augmented data may also be generated, for example, as described in Liu et al. (US2020/0183035A1), which relates to data augmentation for seismic interpretation, recognizing that standard data augmentation strategies may produce limited plausible alternative samples and/or may lead to geologically or geophysically infeasible to implausible alternative samples. The machine learning method involves extracting patches from input data and transforming that data based on the input data and geologic and/or geophysical domain knowledge to generate augmented data. Transforming data is selected from an identity transformation, a spatial filter, a temporal filter, an amplitude scaling, a rotational transformation, a dilatational transformation, a deviatoric transformation, a resampling using interpolation or extrapolation, a spatial and temporal frequency modulation, a spectral shaping filter, an elastic transformation, an inelastic transformation, and a geophysical model transformation. In another embodiment, two pieces of data are blended together to generate a new piece of data. Other geophysical augmenting methods may also be used to generate augmented data. The labels may be preserved or modified in the augmentation. In this way, the data set size may be augmented to improve the model by introducing variations of data without requiring resources of acquiring and labeling field-acquired data or generating new synthetic data. Preferably, the augmented data is generated by a test-time augmentation technique.

The backpropagation-enabled model 12 is used to compute a set of initial inferences 22 from a target data set 18, in an inference mode 20b. The target data set 18 may be comprised of seismic data selected from the group consisting of 1D seismic data, 2D seismic data, 3D seismic data, 4D seismic data, 5D seismic data, and combinations thereof. The target data set 18 may be labeled or unlabeled. Preferably, the target data set 18 is unlabeled. At least a portion of the target data set 18 and associated initial inferences 22 is combined with at least a portion of the initial set of training data 14 to generate a set of updated training data 24.

In one embodiment, the respective portions of the target data set 18 and associated initial inferences 22 and the initial set of training data 14 are selected to be a numerical subset, a thresholded subset or a combination thereof. For example, the size of the subset may be determined by a computational budget. In a preferred embodiment, the set of initial inferences 22 is thresholded to retain the most reliable initial inferences 22 and the associated training data 14 for further processing. Preferably, the set of updated training data 24 includes inferences 22 and initial training data 14 with labels from the same classes.

The set of updated training data 24 is then used to train the backpropagation-enabled model 12, in a training mode 20c. The trained backpropagation-enabled model 12 is used to compute updated inferences 26 on the target data set 18, in an inference mode 20d.

A set of further-updated training data 28 is defined by combining at least a portion of the initial set of training data 14 and at least a portion of the target data set 18 and associated updated inferences 26.

In one embodiment, the set of further updated training data 28 is high-graded, for example, by selecting a numerical subset, a thresholded subset or a combination thereof. For example, the size of the subset may be determined by a computational budget. In a preferred embodiment, the set of further-updated training data 28 is thresholded to retain the most reliable updated inferences 26 and associated target data 18 for further processing.

The set of further-updated labels 28 is then used to train the backpropagation-enabled model 12, in a training mode 20e. The trained backpropagation-enabled model 12 is used to compute further-updated inferences 32 on the target data set 18, in an inference mode 20f.

Figure 2:
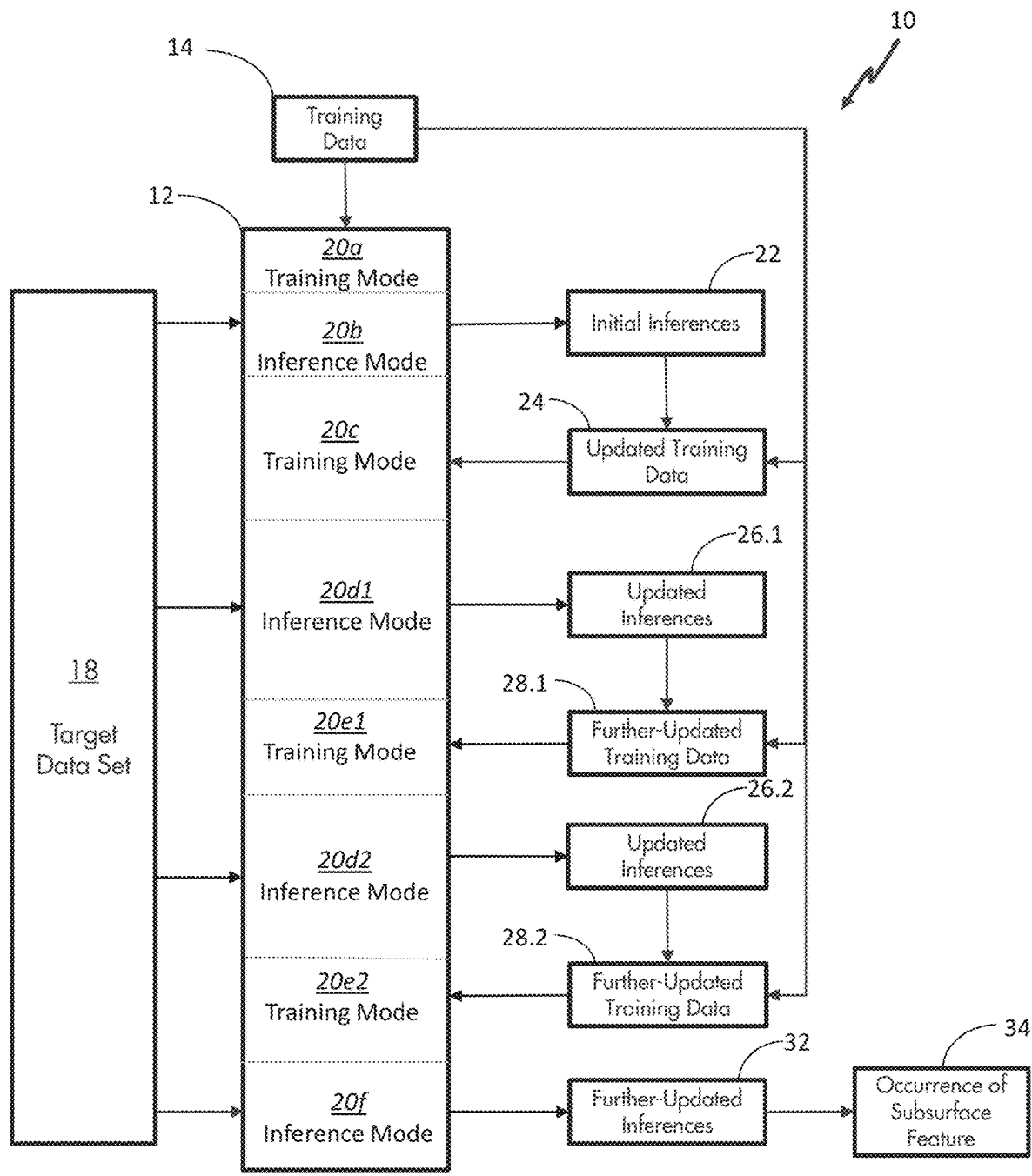
FIG. 2 is a flow diagram illustrating another embodiment of the method of the present invention.

Referring now to FIG. 2, in another embodiment of the method of the present invention 10, the steps of defining a set of further-updated training data 28, training the backpropagation-enabled model 12 using the set of further-updated training data 28, and computing further-updated inferences 32 may be repeated one or more times.

As shown in FIG. 2, the trained backpropagation-enabled model 12 is used to compute updated inferences 26.1 on the target data set 18, in an inference mode 20d1.

A set of further-updated training data 28.1 is defined by combining at least a portion of the initial set of training data 14 and at least a portion of the target data set 18 and associated updated inferences 26.1.

The set of further-updated labels 28.1 is then used to train the backpropagation-enabled model 12, in a training mode 20e1. The trained backpropagation-enabled model 12 is then used to compute updated inferences 26.2 on the target data set 18, in an inference mode 20$d$2.

A set of further-updated training data 28.2 is defined by combining at least a portion of the initial set of training data 14 and at least a portion of the target data set 18 and associated updated inferences 26.2. The set of further-updated labels 28.2 is then used to train the backpropagation-enabled model 12, in a training mode 20$e$2.

As shown in FIGS. 1 and 2, the trained backpropagation-enabled model 12 is used to compute further-updated inferences 32 on the target data set 18, in an inference mode 20$f$. The further-updated inferences 32 are then used to identify the occurrence of a user-selected subsurface feature 34 in the target data set 18 of seismic data.

Examples of subsurface features include, without limitation, boundary layer variations, overlapping beds, rivers, channels, tributaries, salt domes, basins, and combinations thereof. Subsurface features also include indicators of geologic processes including, without limitation, tectonic deformation, erosion, infilling, and combinations thereof. Examples of tectonic deformation processes include, without limitation, earthquakes, creep, subsidence, uplift, erosion, tensile fractures, shear fractures, thrust faults, and combinations thereof. Subsurface features may also include lithofacies, the geologic environment in which the rocks were deposited, and any combination of oil, gas or brine occupying the pore space of the rock matrix. Subsurface features may also include elements of a working petroleum system such as source rocks, migration pathways, reservoir rocks, seal (a.k.a. cap rock) and trapping elements.

EXAMPLE

The following non-limiting example of an embodiment of the method of the present invention as claimed herein is provided for illustrative purposes only.

A semi-supervised process was trained with an initial set of training data comprised of seismic data and initial labels identifying subsurface features in the training data.

Figure 3A:
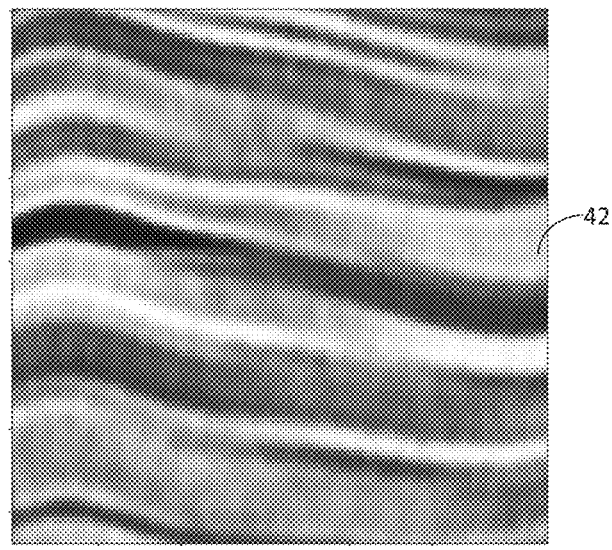
FIG. 3A is an example of a target data set used an example of one embodiment of the present invention.
Figure 3B:
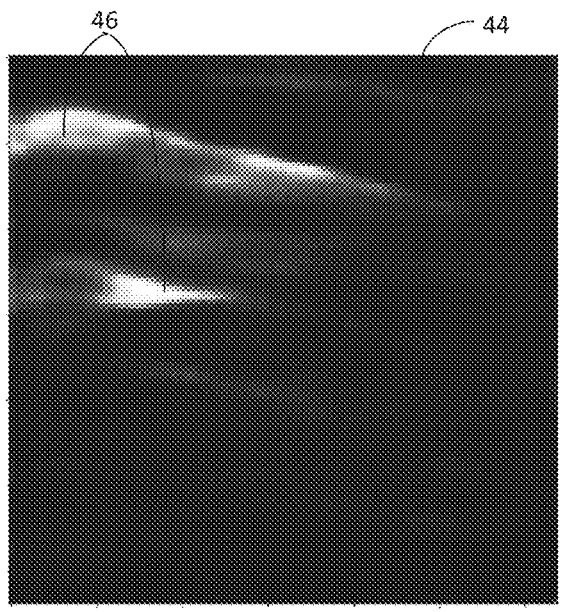
FIG. 3B is an initial inference computed in the example of the present invention.
Figure 3C:
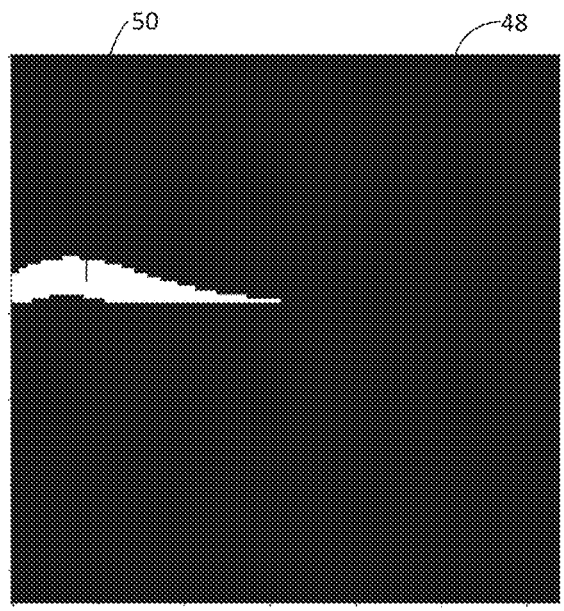
FIG. 3C is a further-updated inference computed in the example of the present invention.

Referring now to FIGS. 3A-3C, a target data set comprising seismic data 42 was then provided to the trained model. An initial set of inferences 44 was computed. As shown in FIG. 3B, the initial set of inferences 44 shows two predicted regions of hydrocarbon accumulation 46.

The initial inferences 44 were then used to further train the model, together with the initial training data and the target data set. An updated set of inferences (not shown) was computed. The updated set of inferences was used with initial training data and the target data set to define a set of further-updated training data, which was then used to further train the model. A further-updated set of inferences 48 was computed. As shown in FIG. 3C, the further-updated set of inferences 48 shows one region of hydrocarbon accumulation 50. The region is also more well-defined in the further-updated set of inferences 48, as compared with the initial set of inferences 44. The further-updated set of inferences was compared with well results to confirm that the method of the present invention improves the accuracy and quality of inferences. It can be seen that the upper inference 46 in FIG. 3B was a false positive prediction of a hydrocarbon accumulation.

By using the method of the present invention, the inferences are more accurate with reduced false positives.

While preferred embodiments of the present invention have been described, it should be understood that various changes, adaptations and modifications can be made therein within the scope of the invention(s) as claimed below.

The invention claimed is:

1. A method for improving a backpropagation-enabled process for identifying subsurface features from seismic data, the method comprising the steps of:
   (a) providing a backpropagation-enabled model, the backpropagation-enabled model having been trained with an initial set of training data comprising seismic data and initial labels identifying a subsurface feature in the seismic data;
   (b) providing a target data set;
   (c) computing a set of initial inferences on the target data set using the backpropagation-enabled model;
   (d) defining a set of updated training data by combining at least a portion of the initial set of training data and at least a portion of the target data set and at least a portion of the set of initial inferences associated with the at least a portion of the target data set;
   (e) training the backpropagation-enabled model with the set of updated training data;
   (f) computing updated inferences on the target data set with the backpropagation-enabled model trained in step (e);
   (g) defining a set of further-updated training data by combining at least a portion of the initial set of training data and at least a second portion of the target data set and at least a portion of the set of updated inferences associated with the at least a second portion of the target data set;
   (h) training the backpropagation-enabled model with the set of further-updated training data;
   (i) computing further-updated inferences on the target data set with the trained backpropagation-enabled model trained in step (h); and
   (j) identifying an occurrence of a user-selected subsurface feature in the target data set from the further-updated inferences.

2. The method of claim 1, further comprising the step of repeating steps (g)-(i) one or more times.

3. The method of claim 1, wherein the initial set of training data comprises field-acquired seismic data, augmented seismic data, or combinations thereof.

4. The method of claim 1, wherein the target data set is comprised of seismic data selected from the group consisting of 1D seismic data, 2D seismic data, 3D seismic data, 4D seismic data, 5D seismic data, and combinations thereof.

5. The method of claim 1, wherein the target data set is unlabeled.

6. The method of claim 1, wherein the target data set is labeled.

7. The method of claim 1, wherein step (d) further comprises a step of thresholding.

8. The method of claim 1, wherein step (g) further comprises a step of thresholding.

9. The method of claim 1, wherein the backpropagation-enabled process is selected from the group consisting of supervised processes, semi-supervised processes, and combinations thereof.

* * * * *